United States Patent [19]

Wu et al.

[11] Patent Number: 5,413,439
[45] Date of Patent: May 9, 1995

[54] UNIVERSAL SPINDLE HEAD FOR MACHINE TOOL

[75] Inventors: Jinn-Fa Wu; Chun-Hung Huang, both of Hsinchu, Taiwan, Prov. of China

[73] Assignee: Industrial Technology Research Institute, Hsinchu, Taiwan, Prov. of China

[21] Appl. No.: 210,550

[22] Filed: Mar. 18, 1994

[51] Int. Cl.$^6$ .............................................. B23C 1/12
[52] U.S. Cl. .................................... 409/216; 409/211; 409/232
[58] Field of Search ............... 409/211, 216, 231, 232, 409/233, 234, 201; 408/35; 483/32; 29/40, 26 A

[56] References Cited

U.S. PATENT DOCUMENTS

| | | | |
|---|---|---|---|
| 3,380,347 | 4/1968 | Habib | 409/216 |
| 3,828,649 | 8/1974 | Lecailtel et al. | 409/216 X |
| 4,559,682 | 12/1985 | Sachot | 409/216 X |
| 4,610,584 | 9/1986 | Matzkorn et al. | 409/211 |
| 4,657,453 | 4/1987 | Goulot et al. | 409/216 |

Primary Examiner—Z. R. Bilinsky
Attorney, Agent, or Firm—W. Wayne Liauh

[57] ABSTRACT

A universal spindle head device for machine tools, comprising a spindle head with a main spindle, a built-in motor, a first rotating spindle with the end fixed to said spindle head and appearing an inclined angle of 45 degrees toward the main spindle of the machine tool, and its center having a hollow passage; a second rotating spindle with its center axial line located on identical plane to center axial line of said main spindle and first rotating spindle and appearing at an inclined angle of 45 degrees toward the spindle center of the first rotating spindle; and a drive device for driving the spindle head to enable it to rotate centering around the first rotating spindle and second rotating spindle and to change over in direction in order to perform five-side processing of workpiece.

6 Claims, 8 Drawing Sheets

UNIVERSAL SPINDLE HEAD FOR MACHINE TOOL

FIELD OF THE INVENTION

This invention relates to a universal spindle head for a machine tool, and particularly to a simple structure of a universal spindle head for machine tools that can promote the spindle rotational speed and shield the hydraulic oil line therein in order to increase the facility of operating the spindle head while keeping hydraulic oil line from being polluted.

BACKGROUND OF THE INVENTION

For processing a workpiece with complex and cubic shape, it is usually necessary to cut from multiple directions simultaneously (with the exception of the bottom side). This is a universal machine tool or five-side working machine. The conventional five-side working machine, in general, has three types: (1) the vertical/horizontal spindle head found in association with a rotary work table for universal changeover of spindle head; (2) the spindle head which comprises two rotary changeover spindles; (3) the spindle head having two-direction (horizontal, vertical) power output ends to match with rotary spindle that can make spindle head changeover by rotation.

Because the spindle head of a conventional universal machine tool must include a universal changeover mechanism, its spindle transmission system is more complex than that of the common machine tool.

Generally the motor and power supply device of a universal spindle head are mounted on the main body of the machine tool and a transmission system comprising some long transmission spindles, gear sets and bevel gears is provided for transmitting power to the main spindle of the spindle head to make the main spindle rotate. The source of power for this universal spindle head engaged in universal changeover is supplied by a main spindle motor and power device so that the spindle head must include a complex clutch and power switchover device in order to switch the power of the motor and power device to lead the spindle head into universal changeover.

Because the spindle heads of conventional universal machine tools have to use the transmission device of a complex structure for leading main spindle in rotation and direction changeover, the complex structure inside the spindle head as well as the transmission spindle of the transmission device and complex gear sets suffer from severe power loss, increasing main spindle vibration and limiting the maximum rotational speed.

In addition, circuits, air pressure, hydraulic pressure and lubrication oil lines used by the spindle head of the conventional universal machine tool are usually exposed out of spindle head so those oil lines are easily polluted and damaged. Further when spindle head is changing over through rotation lines would be swinging in accordance with the movement of spindle head and therefore easily get twisted out of operating condition.

SUMMARY OF THE INVENTION

One object of this invention is to provide a simple and power-saving universal spindle head device for a machine tool, and also to promote rotational speed of the main spindle.

Another object of this invention is to provide a universal spindle head for machine tool with hydraulic oil lines concealed therein in order to increase operating facility and give a handsome appearance.

These and other objects and advantages of the present invention will become apparent to those skilled in the an after considering the following detailed specification together with the accompanying drawings.

DETAILED DESCRIPTION OF THE PREFERRED EMBODIMENTS

Figure 1:
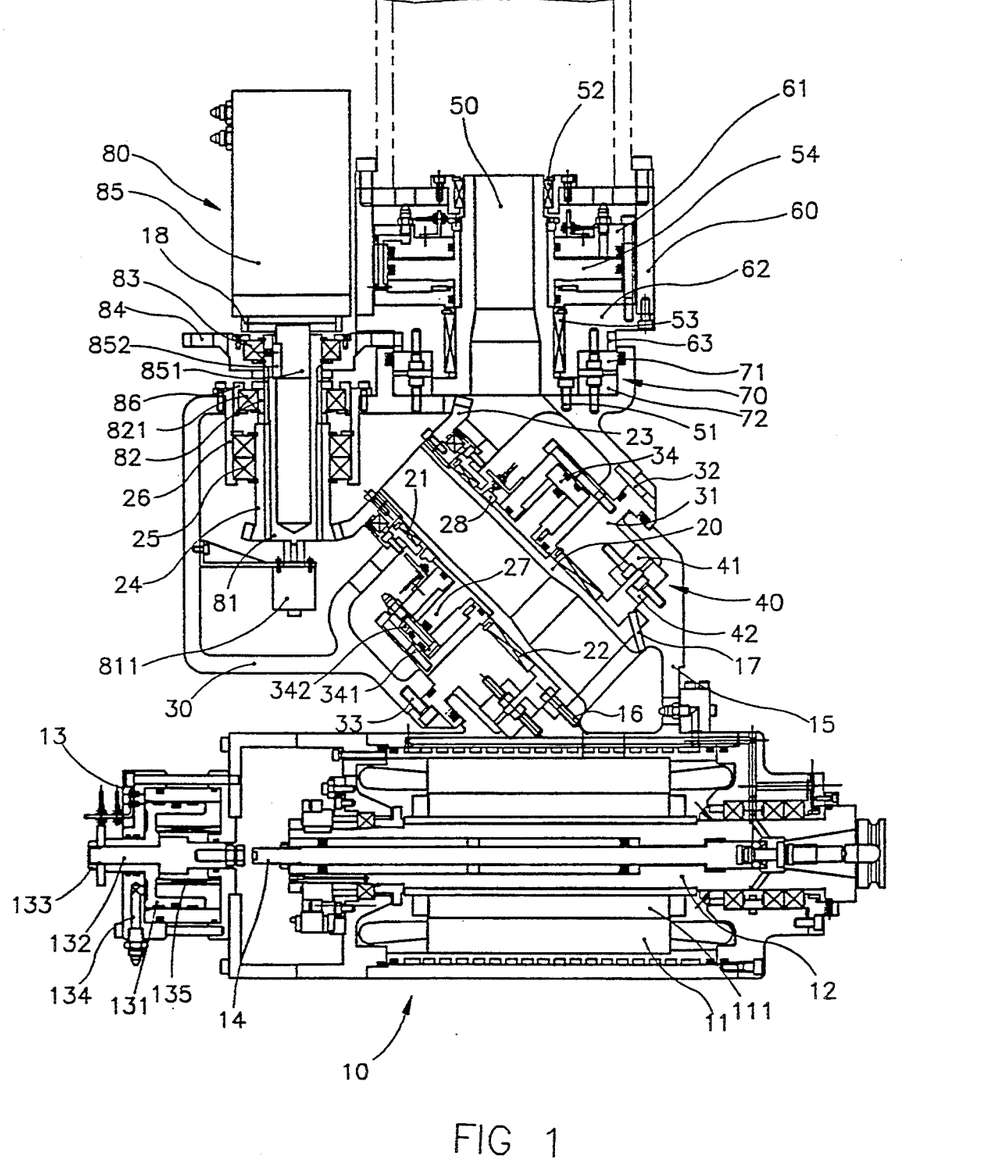
FIG. 1 is a cutaway perspective view of the invention.

Referring to FIG. 1, the present universal spindle head device for machine tool comprises a spindle head 10, spindle head 10 including a main spindle 12 with cutters for rotary cutting process, and containing a built-in motor 11 for driving main spindle 12. Spindle head 10 is mounted on a rotary base 30 by means of the first rotating spindle 20 at a 45 degree incline toward the spindle line of main spindle 12. A curve-tooth corrector 40 is mounted between spindle head 10 and rotary base 30 for positioning spindle head 10. The rotary base 30 has a second rotating spindle 50 at 45 degree incline toward first rotating spindle 20 and locating on the identical plane to the spindle line of said main spindle 12 and first rotating spindle 20, and is connected to a connection seat 60 by means of second rotating spindle 50 and another curve-tooth connector 70 is mounted between rotary base 40 and connection seat 60. Further, on rotary base 30 has a drive device 80, said drive device 80 may lead the first rotating spindle 20 and rotary base 30 in rotation by means of control by drive wheel and clutch while enabling spindle head 10 to change over into different positions for carrying out a five-sided cutting process of a workpiece.

The rotor 111 of motor 11 incorporated within the present spindle head 10 is connected to main spindle 12 by means of interference fit. Therefore the main spindle 12 can be directly driven by a built-in motor 11, which is different with the conventional main spindle and is indirectly driven by motor and gear set mounted on machine tool. Then the rotational speed of main spindle 12 can be greatly promoted and the present transmission structure can be largely simplified because transmission spindle and gear set were omitted Further power loss and vibration can also be reduced.

In addition, in order to match change action of automatic cutter change mechanism of the machine tool, spindle head 10 has a cutter drive hydraulic cylinder 14 on the end of main spindle 12 in order to force cutter on spindle head 12 to depart from the main spindle 12 to to facilitate automatic cutter change mechanism. The cutter drive hydraulic cylinder 13 accommodates a piston 131, in the center of piston 131 having connected a push rod 132; piston 131 is fixed together with push rod 132 by means of a nut 133. When hydraulic oil enters through the oil line 134 of the cutter drive hydraulic cylinder, it may thrust piston 131 for leading push rod 132 to push the pull rod 14 in the spindle center of spindle head 10 while to push out the cutter from the frontal end of main spindle 12 and depart from main spindle 12. When piston 131 has completed the action of driving cutter, a spring 135 would push it back to the original position.

The spindle head 10 casing has a rotating seat 15 to fit mounting seat 31 of rotary base 30 and match portion with mounting seat 31 is made by means of ring sliding fit, therefore rotating seat 15 and mounting seat 31 may move relatively in linear manner and slide by rotation; mounting seat 31 and rotary base 30 are connected together by means of location pin 32 and locked by means of screw 33. The center of rotating seat 15 is connected to the first rotating spindle 20 by means of screw 16 and location pin 17 and spindle head 10 is mounted on rotary base 30 by means of first rotating spindle 20.

Figure 2:
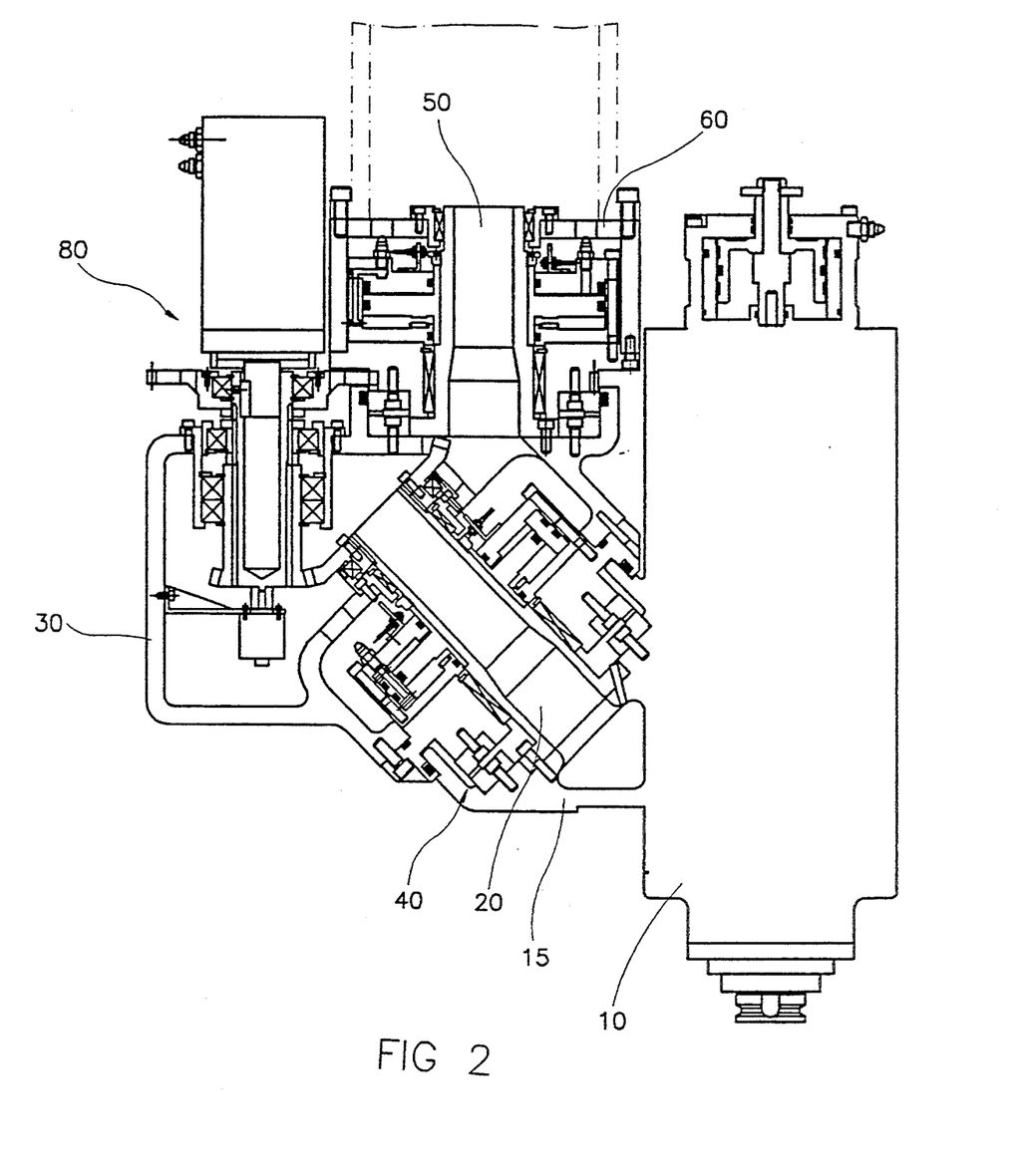
FIG. 2 is a diagrammatic view showing the spindle head of the invention changed over to the vertical way.
Figure 3:
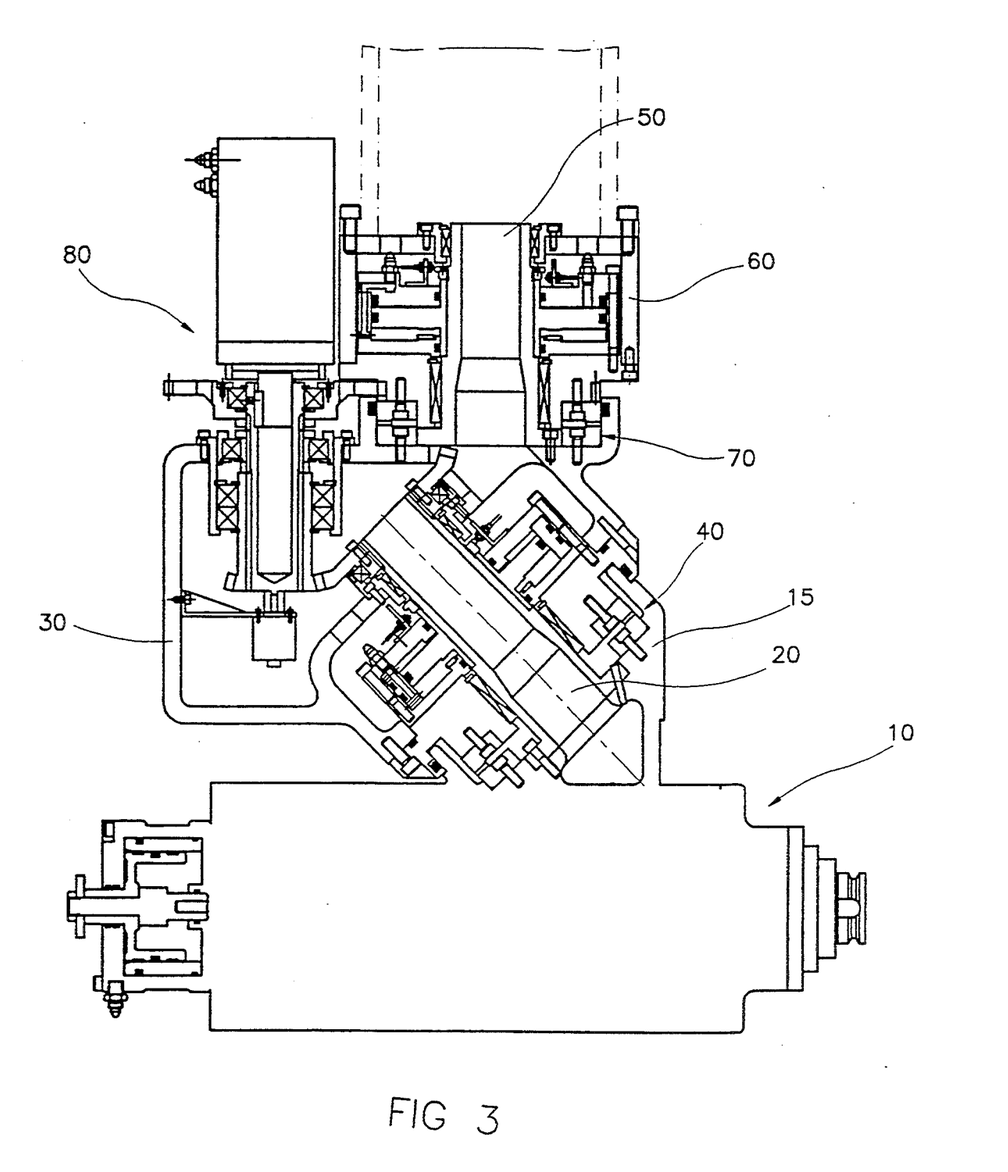
FIG. 3 is a diagrammatic view showing the spindle head of the invention is changed over to the horizontal way.

First rotating spindle 20 and main spindle 12 of spindle head 10 appear at a contact angle of 45 degrees and its rotating spindle center appears an inclined angle of 45 degrees in relation to the horizontal and vertical levels of the machine tool whereby spindle head 10 may employ first rotating spindle 20 as rotating spindle center while to change over into vertical manner as shown in FIG. 2 and enable the spindle 12 to maintain in vertical manner; or to change over into horizontal manner as shown in FIG. 3 to enable the main spindle 12 to appear in horizontal manner. The first rotating spindle 20 center appears as a hollow shape to form a passage allowing oil line to pass through so that spindle head 10 lines can be concealed within the first rotating spindle 20 to avoid swinging in accordance with spindle head 10.

The first rotating spindle 20 can be mounted on rotary base 20 by means of needle bearing 21 and needle bearing 22. Two needle bearings 21, 22 may position first rotating spindle 20 accurately and can sustain the weight of spindle head 10 as well as heavy pressure of main spindle cutting force and further may allow first rotating spindle 20 for reciprocal sliding along the spindle center direction. On the end of first rotating spindle 20 has a follower bevel gear 23, follower bevel gear 23 is connected with first rotating spindle 20 by means of key slot and therefore may slide reciprocally in relation to first rotating spindle 20 while follower bevel gear 23 gears with a drive bevel gear 24. The drive bevel gear 24 is mounted on bearing seat 26 fixed to rotary base 30 by means of needle bearing 25 and its interior resembles a hollow shape while allowing bolt slot spindle 81 of drive device 80 to pass through it. The top end of drive bevel gear 24 has concave-convex tooth shape for gearing with clutch seat 82 (to be described later) connected to bolt slot spindle 81 while enabling power of drive device to lead the drive bevel gear 24 and follower bevel gear 23 in motion while enabling the first rotating spindle 20 in rotation and to be driven by drive device 80.

A curve-tooth connector 40 is mounted between rotating seat 15 of spindle head 10 and mounting seat 31 of rotary base 30 for accurate locating of spindle head 10 to enable spindle head 12 to reach vertical and horizontal accuracy when aligned in a vertical or horizontal manner. A curve-tooth connector 40 comprises an upper tooth disc 41 mounted on mounting seat 31 and lower tooth disc 42 mounted on rotating seat 15. Each contact face of the upper and lower tooth discs 41, 42 has a highly precise concave-convex tooth shape for engaging together each other in order to accurately locate the spindle head.

The engagement or disengagement of upper and lower tooth discs 41, 42 is controlled through reciprocal displacement of the first rotating spindle 20. The intermediate portion of first rotating spindle 20 has a piston 27 which can be dually pushed by a hydraulic cylinder 34 on rotary base 30 to enable the reciprocal displacement of rotating spindle 20. Piston 27 is connected together with said first rotating spindle 20 by means of nut 28 whereby this first rotating spindle 20 can be driven up and down by piston 27.

Hydraulic oil of hydraulic cylinder 34 enters cylinder 34 through oil line 341 to thrust piston 27 while to enable first rotating spindle 20 to move up and to drive rotating seat 15 of spindle head 10 moving up and further to enable lower tooth disc 42 of rotating seat 15 to engage with upper tooth disc 41.

When upper and lower tooth discs of curve-tooth connector 40 are intended to disengage each other, let hydraulic oil enter hydraulic cylinder 34 through oil line 342 to push piston 27 moving down while driving first rotating spindle 20 and rotating seat 15 move down to enable upper and lower tooth discs 41, 42 to disengage each other. Under such condition, first rotating spindle 20 can be driven by drive device 30 in rotation while enabling spindle head 10 to change over in vertical or horizontal manner.

Figure 4:
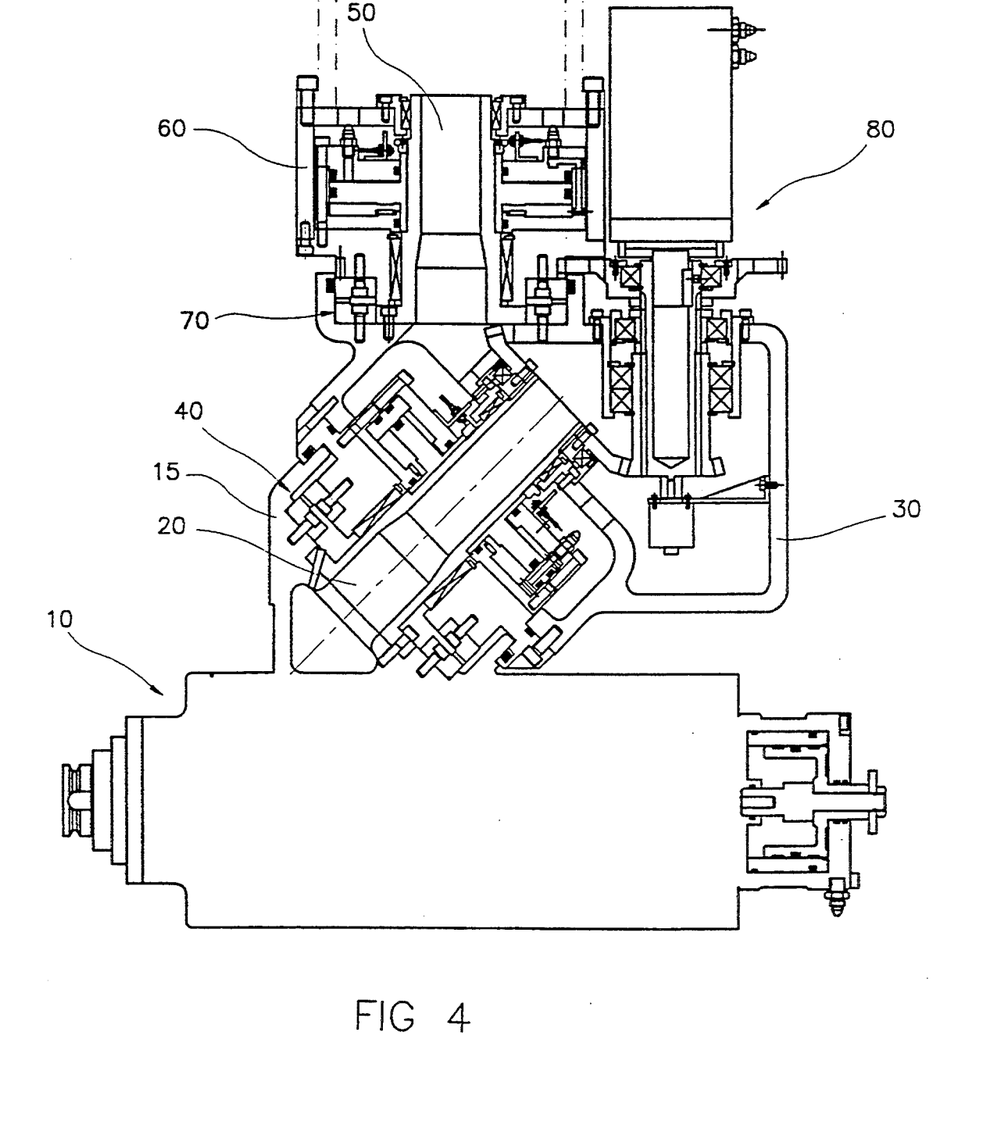
FIG. 4 is a diagrammatic view showing the spindle head of the invention after it has been led by rotary base to a rotation at 180 degrees.

Upon completion of spindle head 10 changing over, rotary base 30 may turn centering around a second rotating spindle 50 while enabling spindle head 10 to change over for processing workpiece in different direction as shown in FIG. 4, i.e. upon turning at 180 degrees rotary base 30 enables spindle head 10 to change over. Rotary base 30 is connected together with second rotating spindle 50 by means of screw 51 and positioned by means of location pin while second rotating spindle 50 is mounted on connection seat 60 by means of roller bearings 52, 53.

Second rotating spindle 50 is rotably and slidably mounted on connection seat 60 and parallel to the vertical or horizontal level of machine tool and its center axial line is located on the identical plane to the center axial line of first rotating spindle 20 and main spindle 12 and at the, same time appears an inclined angle of 45 degrees toward center axial line of said first rotating spindle 20. In addition, its center portion has a through hollow passage for oil lines to pass by and outer portion has a piston 54 which is set in the hydraulic cylinder 61 mounted on connection seat 60 and can be pushed by hydraulic cylinder 61 for driving second rotating spindle 50 move up and down to enable the rotary base 30 to move up or down.

Accuracy of turning angle for rotary table 30 is positioned by means of another curve-tooth connector 70.

Curve-tooth connector 70 includes lower tooth disc 71 mounted on the top of rotary base 30 and upper tooth disc 72 on connection seat 62 mounted on connection 60; lower and upper tooth discs 71, 72 are engaged or disengaged each other by means of second rotating spindle 50 sliding up and down while enabling rotary base 30 in position or in rotation.

The rotation of rotary base 30 is controlled by means of drive device 80. On bolt slot spindle 81 of drive device 80 has a needle bearing 83 which is also used for mounting a drive gear 84 on bolt slot spindle 81 while drive gear 84 is engaged with ring gear 63 on the lower end of mounting seat 62 mounted on connection seat 60. The lower end of drive gear 84 has concave-convex tooth shape for engaging with clutch 82 while enabling said drive gear 84 to connect together with bolt slot spindle 81. Therefore, when clutch 82 is engaged with said drive gear 84, power of drive device 80 can be transmitted to clutch 82 by means of bolt slot spindle 81 for driving drive gear 84 while enabling power transmission to ring gear 63. Because said ring gear 63 is mounted on mounting seat 62, said drive gear 84 and drive device 80 will move around connection seat 62 to produce planetary revolution while driving rotary base 30 rotate centering around a second rotating spindle 50.

Figure 5:
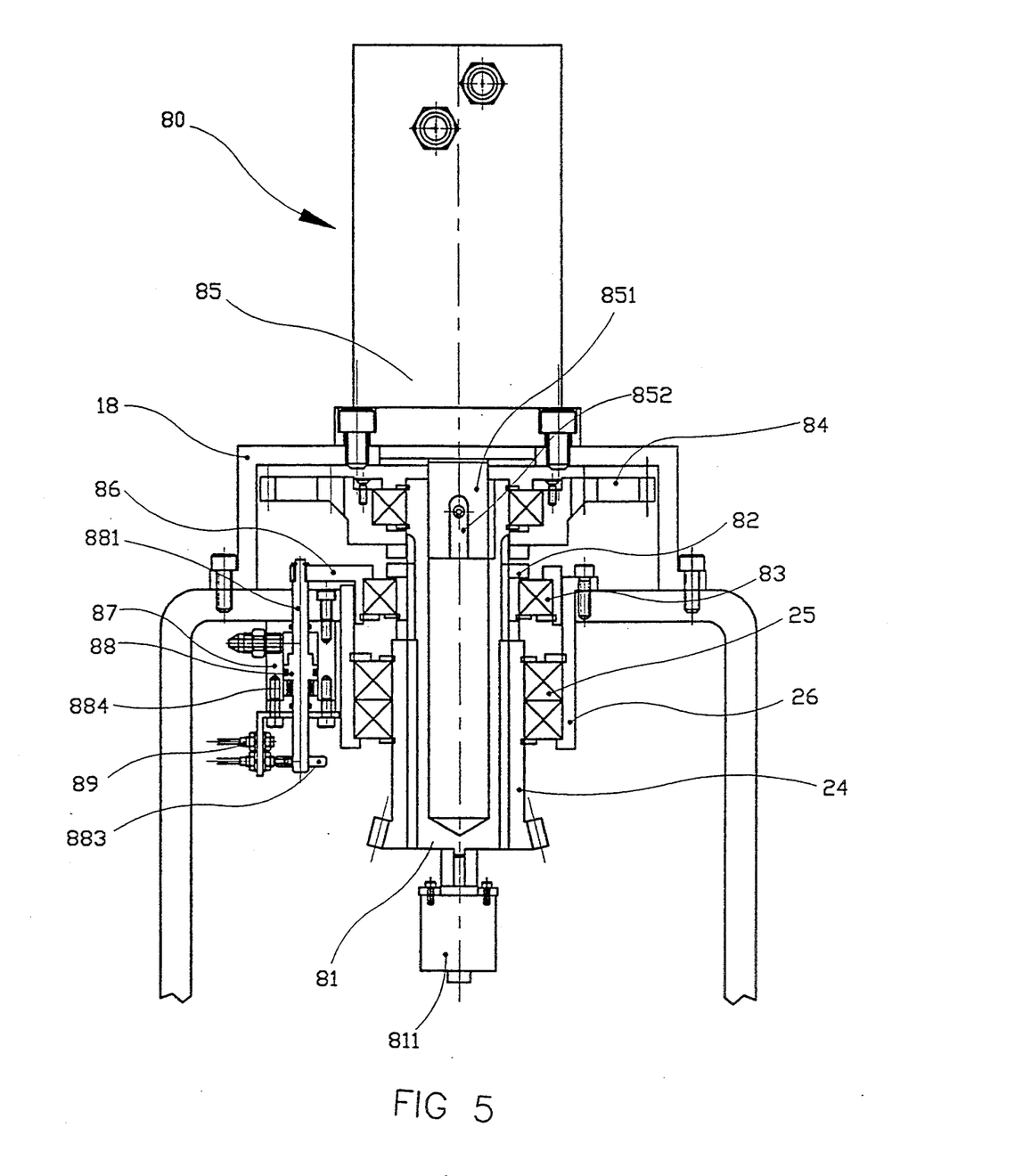
FIG. 5 is a cutaway view of drive device taken on line A—A of FIG. 1, showing the structure of the drive device.

Referring to FIG. 5, said drive device 80 comprises a hydraulic motor 85 which is mounted on a motor seat 18 and on bottom end has a mandrel 851 which is fitted together with bolt slot spindle 81 and connected with parallel key 852. On distal end of bolt slot spindle 81 has a decoder 811 which can detect displacement amount of rotation by hydraulic motor 85 so that the control equipment of the present machine tool may control the action of drive device 80 by means of signal detected by decoder to ensure accurate changeover of the spindle head 10.

The clutch 82 of said drive device 80 is mounted on a clutch plate 86 and fitted to the bolt slot spindle 81 by means of a bearing 821. Clutch 82 and bolt slot spindle 81 are matched by means of slidable key fit so that clutch 82 may slide up and down on bolt slot spindle 81 and at same time can be driven by bolt slot spindle 81 in rotation.

Figure 6:
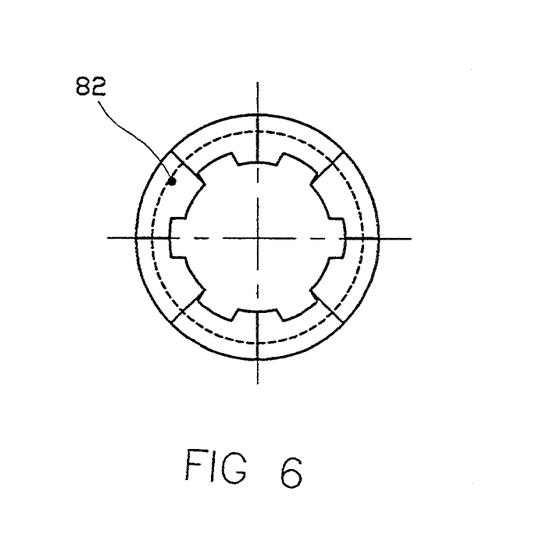
FIG. 6 is a front view of the clutch of the invention.
Figure 7:
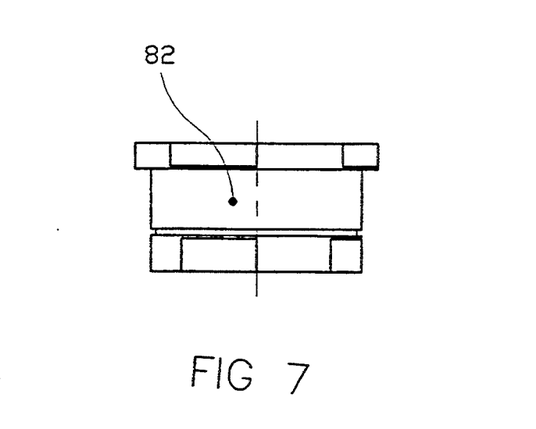
FIG. 7 is a bottom view of the clutch of the invention.

Referring to FIGS. 6 and 7, on the upper and lower ends of clutch 82 have concave-convex tooth shape for engaging with concave-convex tooth shape on the top end of drive bevel gear 24 and on the lower end of drive gear so that power of hydraulic motor 85 can be transmitted to drive bevel gear 24 and drive gear 84.

The drive device 80 further includes a hydraulic cylinder 87 to control clutch 82 moving up and down; hydraulic cylinder 87 includes a piston 88; on upper and lower ends of piston have upper and lower piston rods 881,882; upper piston rod 881 is connected with clutch plate 61 for driving clutch plate 86 up and down; on distal end of lower piston rod 882 a sensor ring 883 detects the displacement of piston 88 in association with limit switch 89.

When hydraulic oil enters the hydraulic cylinder 87, said piston 88 will be pushed down while enabling clutch plate 86 to move down and clutch 82 to set together with drive bevel gear 24. The drive device may turn first rotating spindle 20 while enable the spindle head 10 to change over in vertical or horizontal manner; when hydraulic oil stops entering hydraulic cylinder 87, a spring 884 located under piston 88 will push the piston up to enable clutch 82 to set together with spindle gear 84. Then drive device 80 may turn rotary base 30 in rotation.

Figure 8:
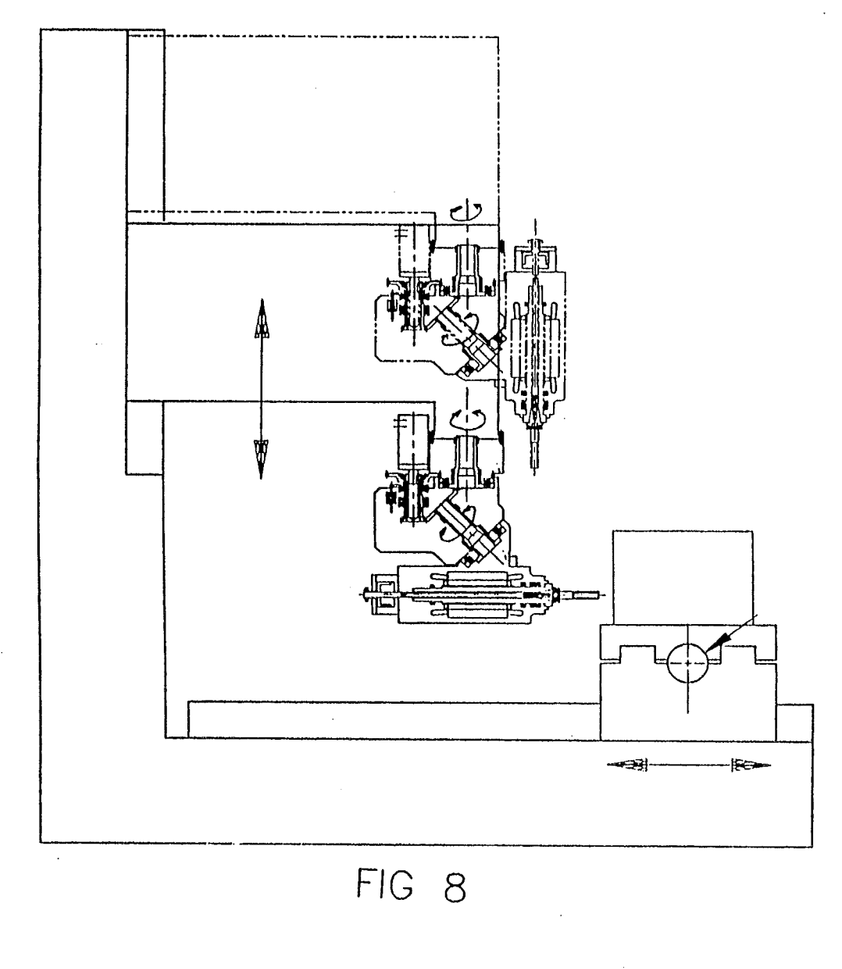
FIG. 8 is an embodiment of the invention, incorporated in the conventional vertical machine tool.
Figure 9:
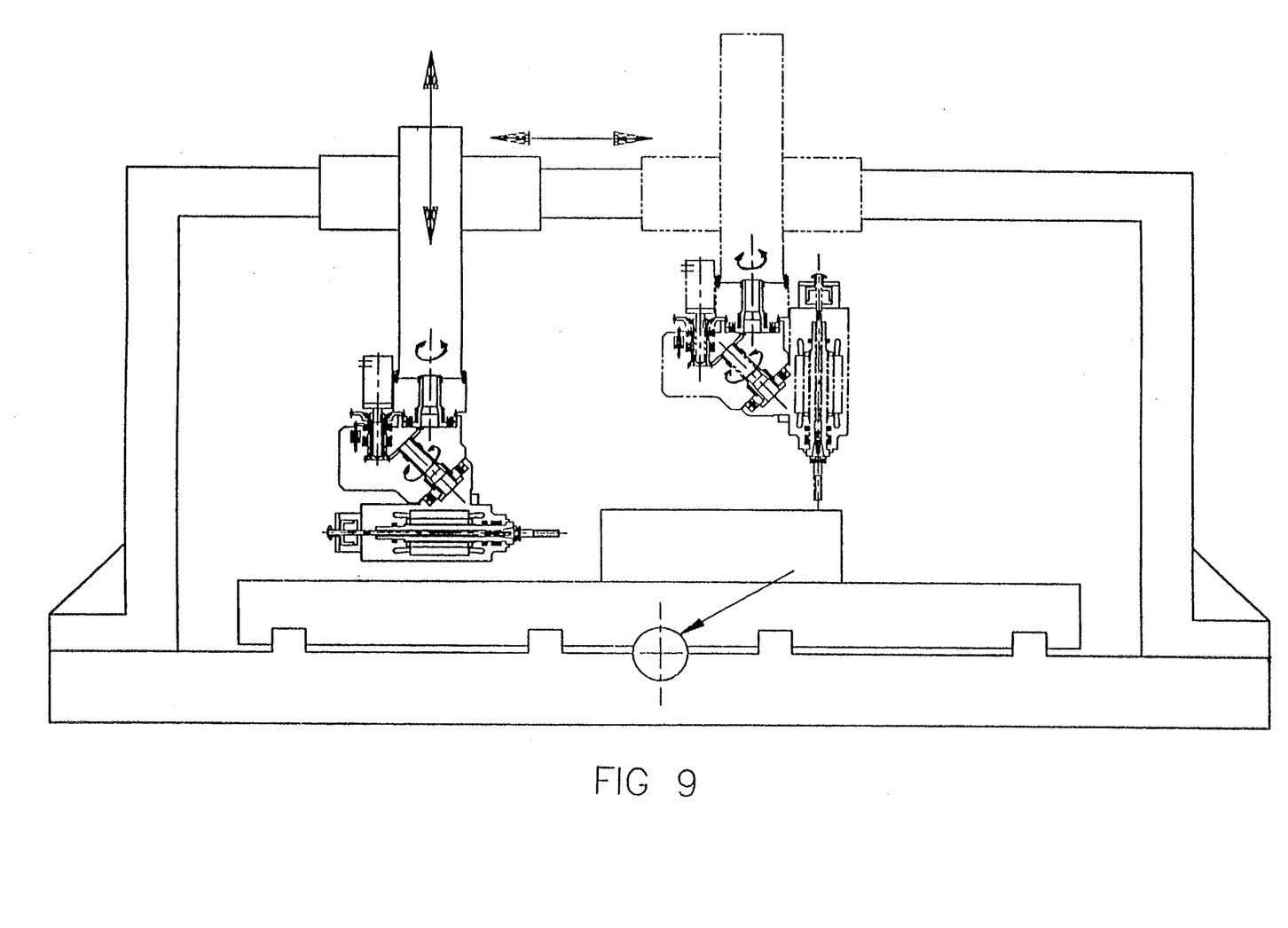
FIG. 9 is an embodiment of the invention, incorporated in the cage type machine tool, and showing the invention when used for multi-side processing of a workpiece.

Referring to FIGS. 8 and 9, the built-in motor 11 of the present universal spindle head for the machine tool serves as power for main spindle 12 in place of the conventional spindle motor and complex transmission system in order to promote rotational speed of main spindle 12 and simplify the structure of the present invention. The present invention can be easily mounted on various types of machine tools to simplify their structure.

Then, the passage formed by the center of first and second rotating spindles 20, 50 may be provided as mounting room for various kinds of pipelines of universal spindle head to enable all hydraulic oil lines of the invention to be concealed without risk of pollution of the oil and damage to the lines and not to swing in accordance with the spindle head. This development advances the operation and reliability of the present invention.

In addition, the present drive device 80 uses single hydraulic motor 85 in association with clutch mechanism and gear set for driving first rotating spindle 20 and rotary base 30 respectively to enable the spindle head 10 to change over the position and direction. Compared to the conventional changeover device of a universal spindle head for a machine tool, the structure of the present invention as a whole is greatly reduced in complexity.

We claim:

1. A universal spindle head device for machine tool comprising:
   a spindle head having a main spindle for holding a cutter for rotary process of workpiece;
   a built-in motor for driving said main spindle in rotation;
   a first rotating spindle having its end affixed to said spindle head at an inclined angle of 45 degrees toward said main spindle of spindle head, the center of said first rotating spindle having a hollow passage along a longitudinal axis through the center of said first rotating spindle;
   a rotary base for said first rotating spindle rotably mounted thereon said rotary base being slidable reciprocally along said longitudinal axis;
   a first locating device mounted between said spindle head and said rotary base for locating a turning angle and position of said spindle head;
   a first driving device for driving said first rotating spindle to move reciprocally along said longitudinal axis;
   a second rotating spindle having an end affixed to said rotary base;
   a connection seat fixedly mounted on a machine tool table and being provided for said second rotating spindle to be rotably and slidably mounted thereon;
   a second driving device for driving said second rotating spindle in reciprocal displacements along said longitudinal axis;
   a second locating device mounted between said rotary base and said connection seat for locating a turning angle and position of said rotary base;
   a power unit;
   a first transmission mechanism for driving said first rotating spindle in rotation;
   a second transmission mechanism for driving said rotary base in rotation centering around said second rotating spindle;

a power switchover device for switching a power of said power unit to either said first transmission mechanism or said second transmission mechanism;

whereby said universal spindle head for machine tool can be directly driven by said built-in motor to simplify power unit and transmission mechanism of said spindle head and at same time to promote rotational speed of said main spindle, and said hollow passages of said first and second rotating spindles allowing oil lines connected to said spindle head to pass therethrough so as to prevent pollution and damage as well as prevent the oil lines from swinging.

2. The universal spindle head device for machine tool as claimed in claim 1 wherein each of said first and second location devices contains a curve-tooth connector.

3. The universal spindle head device for machine tool as claimed in claim 1 wherein said first rotating spindle is driven to reciprocal movement by means of a hydraulic cylinder affixed to said rotary base and a piston incorporated within said cylinder;

said first rotating spindle is parallel to the direction of a movement of said piston which moves through the center of said hydraulic cylinder and said piston, and said first rotating spindle being connected to said piston so that a hydraulic oil entering said hydraulic cylinder can push said piston to move reciprocally while enabling said first rotating spindle to move reciprocally along said longitudinal axis.

4. The universal spindle head device for machine tool as claimed in claim 1 wherein said second rotating spindle is driven to reciprocal movements by means of a hydraulic cylinder affixed to said rotary base and a piston incorporated within said cylinder;

said second rotating spindle is parallel to the direction of a movement of said piston which moves through the center of said hydraulic cylinder and said piston, and said second rotating spindle being connected to said piston so that a hydraulic oil entering said hydraulic cylinder can push said piston to move reciprocally while enabling said second rotating spindle to move reciprocally along said longitudinal axis.

5. The universal spindle head device for machine tool as claimed in claim 1 wherein said drive each of said first and second driving device including:

a drive motor fixedly mounted on said rotary base and having a rotating mandrel;

a first transmission wheel set adapted to drive said rotating mandrel of said drive motor for leading said rotary base to rotate centering around said first rotating spindle;

a second transmission wheel set adapted to drive said rotating mandrel of said drive motor for leading said rotary base to rotate centering around said second rotating spindle;

a power switchover device for controlling said drive motor mandrel to engage or disengage with said first and second transmission wheel sets.

6. The universal spindle head device for machine tool as claimed in claim 1 wherein said power switchover device including a clutch for reciprocal movement along said longitudinal axis of said drive motor mandrel and being adapted to be driven by said mandrel in rotation; and a clutch driving device for driving said clutch in reciprocal displacement so as to allow it to be engaged and disengaged with said first and second transmission wheel sets.

* * * * *